United States Patent
De Palo et al.

(10) Patent No.: US 11,708,484 B2
(45) Date of Patent: *Jul. 25, 2023

(54) COMPOSITIONS OBTAINED FROM RECYCLED POLYOLEFINS

(71) Applicant: BASELL POLIOLEFINE ITALIA S.R.L., Milan (IT)

(72) Inventors: Roberto De Palo, Ferrara (IT); Claudio Cavalieri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 175 days.

This patent is subject to a terminal disclaimer.

(21) Appl. No.: 16/758,758

(22) PCT Filed: Nov. 5, 2018

(86) PCT No.: PCT/EP2018/080091
§ 371 (c)(1),
(2) Date: Apr. 23, 2020

(87) PCT Pub. No.: WO2019/091886
PCT Pub. Date: May 16, 2019

(65) Prior Publication Data
US 2020/0339796 A1    Oct. 29, 2020

(30) Foreign Application Priority Data
Nov. 13, 2017   (EP) .................................... 17201376

(51) Int. Cl.
C08L 23/16   (2006.01)
C08L 23/14   (2006.01)

(52) U.S. Cl.
CPC ............. *C08L 23/16* (2013.01); *C08L 23/14* (2013.01); *C08L 2201/10* (2013.01); *C08L 2203/16* (2013.01); *C08L 2205/03* (2013.01); *C08L 2207/20* (2013.01)

(58) Field of Classification Search
CPC ......... C08l 23/16; C08l 23/12; C08l 2207/20; C08l 2205/02; C08l 2205/025; C08l 23/06; C08l 23/08; C08l 23/0815; C08l 23/10; C08l 23/14; C08l 23/142
See application file for complete search history.

(56) References Cited

U.S. PATENT DOCUMENTS

| | | | | |
|---|---|---|---|---|
| 4,946,898 A | * | 8/1990 | Kasahara | C08L 23/12 525/240 |
| 2006/0214331 A1 | * | 9/2006 | Jacobs | B29C 45/7207 425/346 |
| 2009/0209706 A1 | * | 8/2009 | Sheard | C08L 23/142 526/348 |
| 2010/0119799 A1 | * | 5/2010 | Manrich | C08J 11/06 428/220 |

FOREIGN PATENT DOCUMENTS

| | | | |
|---|---|---|---|
| CN | 106232707 A | 12/2016 | |
| EP | 2062937 A1 | 5/2009 | |
| EP | 2108679 A1 | 10/2009 | |
| WO | 2010149459 A1 | 12/2010 | |
| WO | WO-2015169690 A1 * | 11/2015 | ............. C08L 23/06 |
| WO | 2016005218 A1 | 1/2016 | |

OTHER PUBLICATIONS

Kocsis et al. Polypropylene Handbook, Cham, Springer (Year: 2019).*
International Search Report and Written Opinion dated Jan. 17, 2019 (Jan. 17, 2019) for Corresponding PCT/EP2018/080091.

* cited by examiner

*Primary Examiner* — Mark S Kaucher

(57) ABSTRACT

A polyolefin composition made from or containing:
T1) 70-95 wt %, a polyolefin component containing:
a1) from 30 wt % to 70 wt % of a propylene based polymer; and
a2) from 30 wt % to 70 wt % of an ethylene based polymer;
the sum of a1) and a2), being referred to the total weight of a1) and a2), being 100; and
T2) 5-30 wt % of a propylene ethylene copolymer containing from 2.0 wt % to 10.0 wt %; of ethylene derived units and having a melt flow rate (230° C./2.16 kg) ranging from 0.5 to 20.0 g/10 min, and having a fraction soluble in xylene at 25° C. lower than 20 wt %.
the sum of the amount of T1) and T2), being referred to the total weight of T1) and T2), being 100.

10 Claims, No Drawings

COMPOSITIONS OBTAINED FROM RECYCLED POLYOLEFINS

FIELD OF THE INVENTION

In general, the present disclosure relates to the field of chemistry. More specifically, the present disclosure relates to polymer chemistry. In particular, the present disclosure relates to compositions obtained from recycled polyolefins.

BACKGROUND OF THE INVENTION

Polyolefins are consumed for many applications, including packaging for food and other goods, fibers, automotive components, and a variety of manufactured articles. However, the use of polyolefins is causing concern for environmental impact of the waste materials generated after the first use.

Waste plastic materials are coming from differential recovery of municipal plastic wastes, including flexible packaging (cast film, blown film and BOPP film), rigid packaging, blow-molded bottles and injection-molded containers. Through separation from other polymers, such as PVC, PET or PS, two main polyolefinic fractions of polyethylene and polypropylene are obtained.

A problem in polyolefin recycling is separating quantitatively polypropylene (PP) and polyethylene (PE). In some instances, commercial activities to recycle post-consumer waste (PCW) sources yield mixtures of PP and PE, wherein the minor component reaches up to <50 wt %.

In some instances, recycled PP/PE-blends suffer from deteriorated mechanical and optical properties, poor performance in odor and taste, and poor compatibility between the main polymer phases, resulting in limited impact strength and heat deflection resistance.

SUMMARY OF THE INVENTION

In a general embodiment, the present disclosure provides a polyolefin compositions made from or containing:

T1) 70-95 wt %, a poly olefin component containing:

a1) from 30 wt % to 70 wt % of a propylene based polymer having a propylene content higher than 60 wt %; and a2) from 30 wt % to 70 wt % of an ethylene based polymer having an ethylene content higher than 70;

the sum of a1) and a2), being referred to the total weight of a1) and a2), being 100; and T2) 5-30 wt % of a propylene ethylene copolymer containing from 2.0 wt % to 10.0 wt %; of ethylene derived units and having a melt flow rate (230° C./2.16 kg) ranging from 0.5 to 20.0 g/10 min, and having a fraction soluble in xylene at 25° C. lower than 20 wt %.

the sum of the amount of T1) and T2), being referred to the total weight of T1) and T2), being 100;

DETAILED DESCRIPTION OF THE INVENTION

In some embodiments, the present disclosure provides a polyolefin compositions made from or containing:

T1) 70-95 wt %, alternatively 75-90 wt %; alternatively from 77 wt % to 85 wt % of a polyolefin component containing:

a1) from 30 wt % to 70 wt %, alternatively from 40 wt % to 60 wt %, alternatively from 45 wt % to 55 wt %, of a propylene based polymer having a propylene content higher than 60 wt %: alternatively higher than 70 wt %; alternatively higher than 80 wt %, alternatively higher than 90 wt %; and a2) from 30 wt % to 70 wt %, alternatively from 40 wt % to 60 wt %, alternatively from 45 wt % to 55 wt %, of an ethylene based polymer having an ethylene content higher than 70, alternatively higher than 75 wt %; alternatively higher than 80 wt %, alternatively higher than 90 wt %; the sum of a1) and a2), being referred to the total weight of a1) and a2), being 100; and T2) 5-30 wt %, alternatively 10-25 wt %; alternatively from 15 wt % to 23 wt %; of a propylene ethylene copolymer containing from 2.0 wt % to 10.0 wt %; alternatively from 3.0 wt % to 8.0 wt %, alternatively from 4.2 wt % to 7.3 wt %, of ethylene derived units and having the melt flow rate (230° C./2.16 kg) ranging from 0.5 to 20.0 g/10 min, alternatively from 1.0 to 15.0 g/10 min, alternatively from 1.3 to 9.2 g/10 min, alternatively from 1.3 to 3.1 g/10 min and having a fraction soluble in xylene at 25° C. lower than 20 wt %.

the sum of the amount of T1) and T2), being referred to the total weight of T1) and T2), being 100. In some embodiments, the polyolefin composition has a melt flow rate (230° C./2.16 kg) ranging from 0.5 to 25.0 g/10 min.

In some embodiments, the polyolefin composition is used for the production of films, including cast films, blown films, bioriented films, monolayer films, or multilayer films with a reduction of gels number in the films.

In some embodiments, component T1) is a mixture of recycled polypropylene and polyethylene blend.

In some embodiments, component a1) is propylene homopolymer containing from 0 to 5 wt % of comonomers being olefin derived units, alternatively alpha olefins derived units having from 2 to 10 carbon atoms. In some embodiments, the alpha-olefin derived units having from 2 to 10 carbon atoms are selected from the group consisting of ethylene, 1-butene, 1-hexene and 1-octene derived units. In some embodiments, the alpha-olefin derived units are ethylene derived units. In some embodiments, component a1) is propylene homopolymer.

In some embodiments, component a2) is an ethylene homopolymer or copolymer containing from 0 to 20 wt % of comonomers being olefin derived units, alternatively alpha olefins derived units having from 3 to 10 carbon atoms. In some embodiments, the alpha olefins derived units having from 3 to 10 carbon atoms are selected from the group consisting of propylene, 1-butene, 1-hexene and 1-octene derived units. In some embodiments, the alpha olefins derived units having from 3 to 10 carbon atoms are selected from the group consisting of 1-butene and 1-hexene derived units.

In some embodiments, propylene ethylene copolymers commercially available from LyondellBasell are used as T2). In some embodiments, the commercial propylene ethylene copolymers bear product numbers RC1908 or RC 1809.

The following examples are given in order to illustrate, but not limit the present disclosure.

EXAMPLES

Characterizations

Xylene-Soluble (XS) Fraction at 25° C.

Solubility in Xylene: Determined as Follows:

2.5 g of polymer and 250 ml of xylene were introduced in a glass flask equipped with a refrigerator and a magnetic stirrer. The temperature was raised in 30 minutes up to the boiling point of the solvent. The resulting clear solution was then kept under reflux and stirred for 30 minutes. The closed flask was then kept for 30 minutes in a bath of ice and water, then in a thermostatic water bath at 25° C. for 30 minutes. The resulting solid was filtered on quick filtering paper. 100 ml of the filtered liquid were poured in a pre-weighed aluminum container, which was heated on a heating plate under nitrogen flow to remove the solvent by evaporation. The container was then kept in an oven at 80° C. under vacuum until a constant weight was obtained. The weight percentage of polymer soluble in xylene at room temperature was then calculated.

The content of the xylene-soluble fraction is expressed as a percentage of the original 2.5 grams and then, by the difference (complementary to 100%), the xylene insoluble percentage (%);

Melt Flow Rate (MFR)

Measured according to ISO 1133 at 230° C. with a load of 2.16 kg.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket, which permitted temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp and the efflux time was registered. The efflux time was converted into a value of intrinsic viscosity through Huggins' equation (Huggins, M. L., J. Am. Chem. Soc., 1942, 64, 2716), based upon the flow time of the solvent at the same experimental conditions (same viscometer and same temperature). A single polymer solution was used to determine [η].

Ethylene Content in the Copolymers $^{13}$C NMR spectra were acquired on a Bruker AV-600 spectrometer equipped with cryoprobe, operating at 160.91 MHz in Fourier transform mode at 120° C.

The peak of the $S_{\beta\beta}$ carbon (nomenclature according to "Monomer Sequence Distribution in Ethylene-Propylene Rubber Measured by $^{13}$C NMR. 3. Use of Reaction Probability Mode," C. J. Carman, R. A. Harrington and C. E. Wilkes, *Macromolecules* 10, 536 (1977)) was used as an internal reference at 29.9 ppm. The samples were dissolved in 1,1,2,2-tetrachloroethane-d2 at 120° C. with an 8% wt/v concentration. Each spectrum was acquired with a 90° pulse, 15 seconds of delay between pulses and composite pulse decoupling (CPD) to remove $^1$H-$^{13}$C coupling. 512 transients were stored in 32K data points using a spectral window of 9000 Hz.

The assignments of the spectra, the evaluation of the triad distribution and the composition were made according to Kakugo ("Carbon-13 NMR Determination of Monomer Sequence Distribution in Ethylene-Propylene Copolymers Prepared with δ-Titanium Trichloride-Diethylaluminum Chloride," M. Kakugo, Y. Naito, K. Mizunuma and T. Miyatake, *Macromolecules* 15, 1150(1982)) using the following equations:

$PPP=100\ T_{\beta\beta}/S\ PPE=100\ T_{\beta\delta}/S\ EPE=100\ T_{\delta\delta}/S$ $PEP=100\ S_{\beta\beta}/S\ PEE=100\ S_{\beta\delta}/S\ EEE=100(0.25\ S_{\gamma\delta}+0.5\ S_{\delta\delta})/S$ $S=T_{\beta\beta}+T_{\beta\delta}+T_{\delta\delta}+S_{\beta\beta}+S_{\beta\delta}+0.25\ S_{\gamma\delta}+0.5\ S_{\delta\delta}$ The molar percentage of ethylene content was determined using the following equation:

$E\ \%\ \text{mol}=100*[PEP+PEE+EEE]$.

Additionally, the weight percentage of ethylene content was determined using the following equation:

$$E\ \%\ \text{wt.} = \frac{E\ \%\ \text{mol}*MW_E}{E\ \%\ \text{mol}*MW_E + P\ \%\ \text{mol}*MW_P}$$

wherein P % mol is the molar percentage of propylene content while $MW_E$ and $MW_P$ are the molecular weights of ethylene and propylene, respectively.

The product of reactivity ratio $r_1 r_2$ was calculated according to Carman (C. J. Carman, R. A. Harrington and C. E. Wilkes, *Macromolecules* 10, 536 (1977)) as:

$$r_1 r_2 = 1 + \left(\frac{EEE+PEE}{PEP}+1\right) - \left(\frac{P}{E}+1\right)\left(\frac{EEE+PEE}{PEP}+1\right)^{0.5}$$

The tacticity of propylene sequences was calculated as mm content from the ratio of the PPP mmT$_{\beta\beta}$ (28.90-29.65 ppm) and the whole T$_{\beta\beta}$ (29.80-28.37 ppm)

Production of T1 Component

To simulate waste recycled polyolefin composition, a blend of 50 wt % of Hostalen GF 9055 F high density polyethylene, which was commercially available from LyondellBasell, and 50 wt % of Moplen HP561R polypropylene homopolymer, which was commercially available from LyondellBasell, was prepared.

T1 component was blended with various propylene based copolymers. A cast film was obtained with the resulting composition. The compositions and the gel number of the film are reported in Table 1.

TABLE 1

| Ex | | Comp 1 | Ex 1 | Ex 2 | Ex 3 | Comp 2 | Comp 3 |
|---|---|---|---|---|---|---|---|
| T1 | Wt % | 100 | | 80 | | 80 | 80 |
| T2 | | | | | | | |
| Clyrell Rc1890 | Wt % | | 20 | | | | |
| Clyrell Rc1908 | Wt % | | | | 10 | | |
| Clyrell Rc1908 | Wt % | | | 20 | | | |
| Adflex X500F | Wt % | 0 | | | | 20 | |
| Hifax x1956A | Wt % | 0 | | | | | 20 |
| Gel number <200 mu | 1/m$^2$ | 728 | 75 | 60 | 68 | 77 | 851 |

Adflex X500F heterophasic composition is commercially available from LyondellBasell.

Clyrell RC1890 polypropylene random copolymer is commercially available from LyondellBasell and has an MFR of 7.0 g/10 min, an ethylene content of 6.1 wt %, and a xylene soluble fraction lower than 20 wt %.

Clyrell RC1908 polypropylene random copolymer is commercially available from LyondellBasell and has an MFR of 1.7 g/10 min, an ethylene content of 6.1 wt %, and a xylene soluble fraction lower than 20 wt %.

Hifax X 1956 A heterophasic TPO (thermoplastic polyolefin) polypropylene is commercially available from LyondellBasell.

The gels count test was carried out on a cast film Collin Extrusion line diameter with a 25 mm single screw with the following features:

Single screw L/D 25
Temperature profile
Cylinders 200 (close to the hopper)→230° C. (at the end of the extruder, before the inlet to the die)
Die 240° C.
Die width 150 mm
Chill roll 30° C.
Film speed 3.0 m/min
Film thickness 50 micron
Inspected area 1 m2
OCS FS5 gel count unit on a 4 cm wide stripe The elongation at break of cast films of examples 1-2 and comparative examples 1-3 were measured, in machine direction (MD) and transverse direction (TD) according to ASTM D 882, in Table 2.

TABLE 2

|  | Elongation at break MD % | Elongation at break TD % |
| --- | --- | --- |
| Comp ex 1 | 1110 | 7 |
| Ex 1 | 1290 | 1070 |
| Ex 3 | 1220 | 880 |
| Comp ex 2 | 1190 | 7 |

What is claimed is:

1. A polyolefin composition consisting of:
   T1) 70-95 wt %, a polyolefin component containing:
   a1) from 30 wt % to 70 wt % of a propylene based polymer having a propylene content higher than 60 wt %; and
   a2) from 30 wt % to 70 wt % of an ethylene based polymer having an ethylene content higher than 70 wt %;
   the sum of a1) and a2), being referred to the total weight of a1) and a2), being 100,
   wherein T1) is a mixture of recycled polyolefin components, a1) and a2); and
   T2) 5-30 wt % of a random propylene ethylene copolymer containing from 2.0 wt % to 10.0 wt % of ethylene derived units, having a melt flow rate (230° C./2.16 kg) ranging from 1.3 to 9.2 g/10 min., and having a fraction soluble in xylene at 25° C. lower than 20 wt %
   the sum of the amount of T1) and T2), being referred to the total weight of T1) and T2), being 100.

2. The polyolefin composition according to claim 1, wherein component T2 contains from 3.0 wt % to 8.0 wt % of ethylene derived units.

3. The polyolefin composition according to claim 1, wherein component T2 contains from 4.2 wt % to 7.3 wt % of ethylene derived units.

4. The polyolefin composition according to claim 1, wherein component T2 has a melt flow rate ranging from 1.0 to 15.0 g/10 min.

5. The polyolefin composition according to claim 1, wherein the polyolefin composition has a melt flow rate (230° C./2.16 kg) between 0.5 to 25 g/10 min.

6. The polyolefin composition according to claim 1, wherein component a1) ranges from 45 wt % to 55 wt % and component a2) from 45 wt % to 55 wt %.

7. The polyolefin composition according to claim 1, wherein the propylene based polymer, a1), comprises 0 to 5 wt. % of comonomers being olefin derived units.

8. The polyolefin composition according to claim 1, wherein a2) is an ethylene homopolymer or copolymer containing from 0 to 20 wt % of comonomers being olefin derived units.

9. A film comprising the polyolefin composition of claim 1.

10. The film according to claim 9 being a cast film, a blown film, a bioriented film, a monolayer film, or a multilayer film.

* * * * *

UNITED STATES PATENT AND TRADEMARK OFFICE
CERTIFICATE OF CORRECTION

Page 1 of 1

PATENT NO. : 11,708,484 B2
APPLICATION NO. : 16/758758
DATED : July 25, 2023
INVENTOR(S) : De Palo et al.

It is certified that error appears in the above-identified patent and that said Letters Patent is hereby corrected as shown below:

In the Specification

In Column 1, Line 3, after "COMPOSITIONS OBTAINED FROM RECYCLED POLYOLEFINS" insert -- This application is the U.S. National Phase of PCT International Application PCT/EP2018/080091, filed November 5, 2018, claiming benefit of priority to European Patent Application No. 17201376.5, filed November 13, 2017, the contents of which are incorporated herein by reference in its entirety. --

In Column 5, Line 3, delete "→230°C" and insert -- -> 230° C. --, therefor

Signed and Sealed this
Twenty-fifth Day of February, 2025

Coke Morgan Stewart
*Acting Director of the United States Patent and Trademark Office*